F. D. WEISSE.
ATTACHMENT OF DENTAL MANIKIN HEADS TO THE PATIENTS' HEAD RESTS OF DENTAL CHAIRS.
APPLICATION FILED JUNE 18, 1913.
1,215,087.
Patented Feb. 6, 1917.
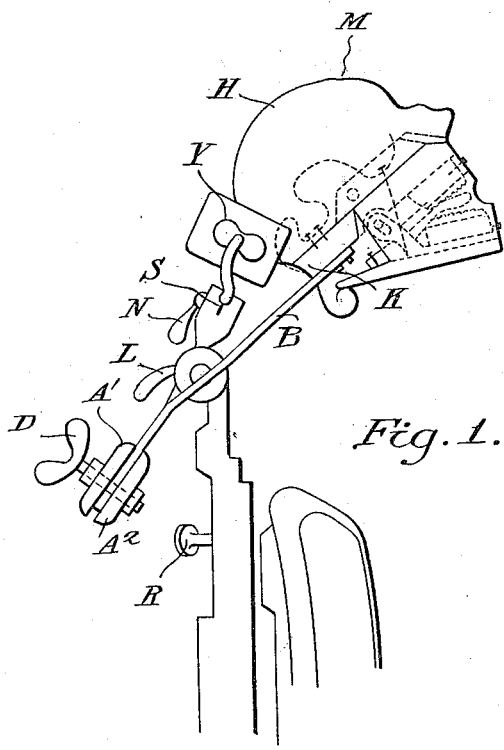
Fig. 1.
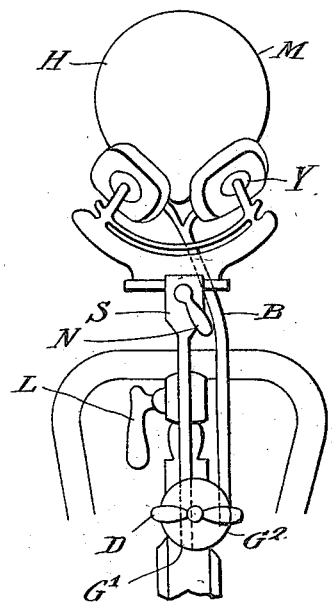
Fig. 2.
Fig. 3.
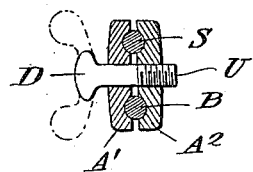
Fig. 4.
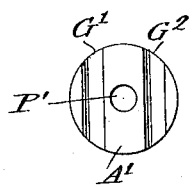
Fig. 5.
Witnesses
Felix von Ocfele.
Arthur Labo
Inventor:
Faneuil D. Weisse Dec'd
Dental Manikin Head Co. Inc. Assignee of Faneuil D. Weisse
H. Schweitzer
Secretary.

UNITED STATES PATENT OFFICE.

FANEUIL D. WEISSE, OF NEW YORK, N. Y., ASSIGNOR TO DENTAL MANIKIN HEAD CO. INC., A CORPORATION OF NEW YORK.

ATTACHMENT OF DENTAL MANIKIN-HEADS TO THE PATIENTS' HEAD-RESTS OF DENTAL CHAIRS.

1,215,087.　　　　　　Specification of Letters Patent.　　　Patented Feb. 6, 1917.

Original application filed October 1, 1912, Serial No. 723,726. Divided and this application filed June 13, 1913. Serial No. 774,339.

*To all whom it may concern:*

Be it known that I, FANEUIL D. WEISSE, a citizen of the United States, residing at New York, in the county of New York and State of New York, have invented Improvements in the Attachment of Dental Manikin-Heads to the Patients' Head-Rests of Dental Chairs, of which the following is a specification.

This application is divided from an invention described in my co-pending application for Letters Patent Ser. No. 723,276 for anatomical manikin heads, filed Oct. 1, 1912.

The attachment of a head articulator to the back seat of a dental chair has been described by Magnusson, U. S. Pat. No. 451,061 of April 28, 1891. A stationary attachment of a dental manikin head to a heavy base was also known heretofore. Neither of the described attachments, however, affords the practitioner an opportunity to do dental operative and prosthetic practice work under exactly the same conditions as though operating upon a human head while on the patient's headrest of a dental chair. It has not been known heretofore to connect in an adjustable manner a dental manikin head with the patient's headrest of a dental chair.

The special attachment of a dental manikin head to the patient's headrest of dental chairs is the object of my present invention.

Figure 1 is a lateral view of a manikin head and the so-called Diamond dental chair showing the adjustment of the head to the headrest of said chair. Fig. 2 is a back view of the same. Fig. 3 is a sectional view of the clamp plates A' and A² in connection with the screw spindle D. Fig. 4 shows the inner surface of plate A', and Fig. 5 shows the inner surface of plate A².

The connection of the head H with the patient's headrest Y of the dental chair is made by a steel bracket B; this bracket is fastened at the skull base of the head. It is swung in a suitable way around the central stem S of the headrest, and both bracket and stem can be clamped by means of my special adjustment. This adjustment may vary in shape and structure according to the construction of the various headrests of dental chairs without deviating from the spirit and nature of my device as the principle in all cases remains the same. This special adjustment as shown in Figs. 1 and 2 and as illustrated in detail in Figs. 3, 4, and 5, holds tightly in place, at the same time, both the central stem S of the headrest of the dental chair, and also holds tightly the bracket B of the manikin head. This adjustment is provided with a set screw, in this case being a thumb screw D as shown in Figs. 1, 2 and 3. It is by means of this set thumb screw that the central stem S and the bracket B may be tightened or loosened in this adjustment. When tightened the manikin head is then rigidly held in place to the headrest of the dental chair. When the thumb screw is loosened the manikin head may be removed from its connection with the dental chair. In order that the central stem S and the bracket B may be rigidly held in this special adjustment, provision is made in this adjustment, by means of two grooves G' and G² (Figs. 2, 4 and 5) through which the stem S and the bracket B pass. These grooves G' and G² lie in the metallic plates A' and A² shown in Figs. 3, 4 and 5. These metallic plates A' and A² contain circular central perforations P' and P² (Figs. 4 and 5). The perforation P² in the plate A² is provided with a screw thread to receive the screw spindle U of the set screw D (Fig. 3). The set thumb screw D shown in Figs. 1, 2 and 3 passes through the perforation P' of the plate A' and fits the threaded perforation P² of the plate A². The set screw D is turned in the thread until the head of the screw presses against the outer surface of the plate A'. The inner surface of the plate A' and the inner surface of the plate A², facing each other, are provided each with two grooves G' and G² as noted above. Groove G' of the plate A' will lie opposite to groove G' of the plate A². Also groove G² of the plate A' will lie opposite to groove G² of the plate A² so that when groove G' of the plate A' and groove G' of the plate A² come together, a cylindrical opening is formed. Another such cylindrical opening is formed when groove G² of the plate A' and groove G² of the plate A² are adjacent each other. It is through these cylindrical openings that the central stem S on the left side and the bracket B on the right side, pass. Therefore, when the set thumb screw is tightened and the manikin head is in its proper position, the plates A' and A² will substantially touch, and rigidly clamp the stem S and the bracket B by means of the cylindrical openings formed by the grooves in the clamping plates.

My device differs distinctly from all others in having the manikin head not fastened to the chair but to the patient's headrest.

With the headrest in position upon a dental chair an operator may familiarize himself with the conditions under which a patient's head is located in said patient's headrest when the manikin head, adjusted to the patient's headrest, follows all the movements to which the headrest of the dental chair is subjected. The headrest Y is clamped against the back seat of a dental chair by means of the clamp lever L in the usual way. An extensible section of the seat back can be set at a suitable height by means of the set screw R (Fig. 1). The clamp lever N (Fig. 2) allows a shifting movement of the headrest to the right or to the left.

Having now fully described my invention, I claim;

In combination, a dental manikin head having a bracket, a headrest of a dental chair having a central stem, and a clamp consisting of double grooved metal plates; said clamp being adjustable to said bracket and stem by means of a screw.

FANEUIL D. WEISSE, M. D., DEAN.

Witnesses:
H. SCHWEITZER,
WM. H. KRUSE.

Copies of this patent may be obtained for five cents each, by addressing the "Commissioner of Patents, Washington, D. C."